(12) United States Patent
Chou

(10) Patent No.: US 11,262,260 B2
(45) Date of Patent: Mar. 1, 2022

(54) CONNECTION STRUCTURE OF DIAPHRAGM PRESSURE GAUGE

(71) Applicant: Chin Ray Industrial Ltd., Shuishang Township, Chiayi County (TW)

(72) Inventor: Po-Hsien Chou, Shuishang Township (TW)

(73) Assignee: Chin Ray Industrial Ltd., Shuishang Township (TW)

( * ) Notice: Subject to any disclaimer, the term of this patent is extended or adjusted under 35 U.S.C. 154(b) by 122 days.

(21) Appl. No.: 15/930,667

(22) Filed: May 13, 2020

(65) Prior Publication Data

US 2020/0408627 A1   Dec. 31, 2020

(30) Foreign Application Priority Data

Jun. 28, 2019   (TW) .................................. 108122890

(51) Int. Cl.
*G01L 7/02* (2006.01)
*G01L 1/04* (2006.01)

(52) U.S. Cl.
CPC .............. *G01L 7/022* (2013.01); *G01L 1/046* (2013.01)

(58) Field of Classification Search
CPC ................................ G01L 7/022; G01L 1/046
USPC ........................................................... 73/715
See application file for complete search history.

(56) References Cited

U.S. PATENT DOCUMENTS

| 4,240,297 | A | * | 12/1980 | Speidel | .................. | A61B 5/022 73/711 |
| 4,347,744 | A | * | 9/1982 | Buchanan | ............... | G01L 7/082 137/68.27 |
| 2006/0144135 | A1 | * | 7/2006 | Chou | ....................... | G01B 3/28 73/146.3 |
| 2010/0224002 | A1 | * | 9/2010 | Popp | .................... | G01L 13/025 73/715 |

FOREIGN PATENT DOCUMENTS

GB           2058296 A  *  4/1981  ............... F23N 5/22

* cited by examiner

*Primary Examiner* — Nathaniel T Woodward
(74) *Attorney, Agent, or Firm* — Karin L. Williams; Alan D. Kamrath; Mayer & Williams PC

(57) ABSTRACT

A connection structure of a diaphragm pressure gauge contains: a holder, a coupling sleeve, a disc, a curved abutting bar, a fixing element, a case, a screw element, a circular film, and a defining element. The holder is connected to the coupling sleeve, multiple spaced ribs of the holder extend out of the coupling sleeve, and the holder includes the multiple spaced ribs. One of the multiple spaced ribs has at least one spaced protrusion, the disc includes at least one first locating orifice, the curved abutting bar includes a second locating orifice, and the at least one first locating orifice is fitted with the second locating orifice. The curved abutting bar abuts against the fixing element, and the defining element, the circular film and the screw element are connected below the fixing element to produce the diaphragm pressure gauge. The case is covered on the diaphragm pressure gauge.

7 Claims, 8 Drawing Sheets

CONNECTION STRUCTURE OF DIAPHRAGM PRESSURE GAUGE

FIELD OF THE INVENTION

The present invention relates to a connection structure by which the diaphragm pressure gauge is operated and is positioned in a limited space easily.

BACKGROUND OF THE INVENTION

With reference to FIGS. 1-3, a conventional diaphragm pressure gauge contains a case A in which a coupling sleeve B, a base C, a circular film D, an abutting plate E, a disc F, a fixing element G, and a defining element H are accommodated. A hair spring of the defining element G is hooked on an extension K of the coupling sleeve B, a screw element I and a washer J are locked with the defining element H from the circular film D, thus connecting the conventional diaphragm pressure gauge.

However, the defining element G is fixed in a limited space to case connection inconvenience. For example, the defining element H cannot hook with the extension K in a large space quickly.

The present invention has arisen to mitigate and/or obviate the afore-described disadvantages.

SUMMARY OF THE INVENTION

One aspect of the present invention is to provide a connection structure by which a diaphragm pressure gauge is operated and is positioned in a limited space easily.

Another aspect of the present invention is to provide a connection structure which obtains protection and decreases alignment time, size, and fabrication cost to the diaphragm pressure gauge.

To obtain the above aspects, a connection structure of a diaphragm pressure gauge provided by the present invention contains: a holder, a coupling sleeve, a disc, a curved abutting bar, a fixing element, a case, a screw element, a circular film, and a defining element.

The holder is connected to the coupling sleeve, multiple spaced ribs of the holder extend out of the coupling sleeve, and the holder includes the multiple spaced ribs surround proximate to a peripheral side of a top of the holder. One of the multiple spaced ribs has at least one spaced protrusion located adjacent to an outer side of a top of the one spaced rib, the disc includes at least one first locating orifice corresponding to the at least one spaced protrusion respectively, the curved abutting bar includes a second locating orifice corresponding to the at least one spaced protrusion, and the at least one first locating orifice of the disc is fitted with the second locating orifice of the curved abutting bar by ways of the at least one spaced protrusion of the multiple spaced ribs of the holder. The curved abutting bar abuts against the fixing element, and the defining element, the circular film and the screw element are connected below the fixing element to connect the diaphragm pressure gauge, then the case is covered on the diaphragm pressure gauge.

Preferably, the at least one spaced protrusion is located on the top of the one spaced rib.

Preferably, the holder is made of plastic and is connected to the coupling sleeve made of a material different from the plastic of the holder so as to reinforce the connection structure of the diaphragm pressure gauge.

Preferably, the other spaced rib has a slot formed in a U shape so that when the fixing element is fixed on the holder, a hair spring of the fixing element is retained in the slot.

Preferably, the case includes a hook extending from a bottom thereof and configured to hook a bottom of the coupling sleeve so that the case covers the coupling sleeve.

DETAILED DESCRIPTION OF THE PREFERRED EMBODIMENTS

Figure 1:
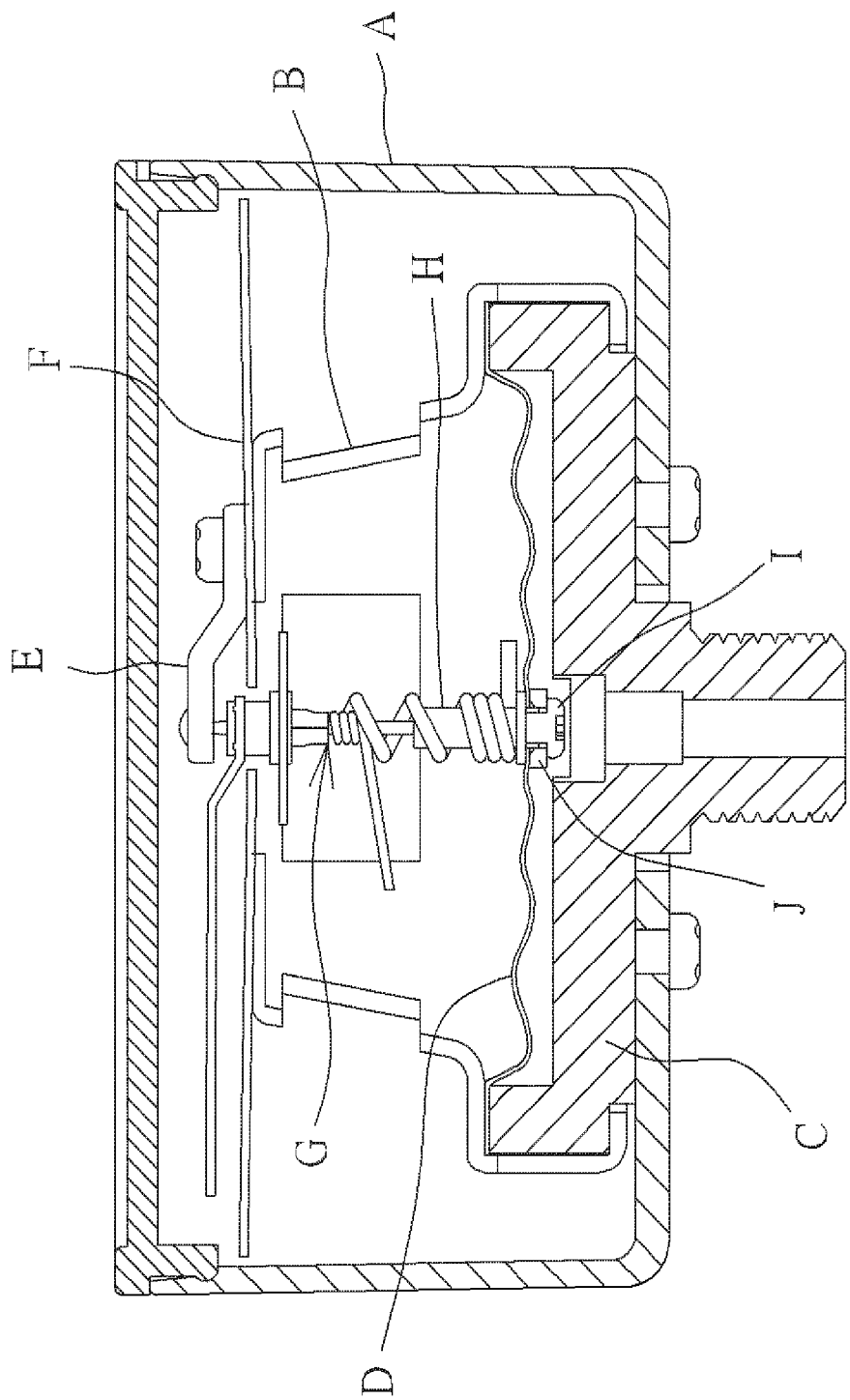
FIG. 1 is a cross sectional view of a conventional diaphragm pressure gauge.
Figure 2:
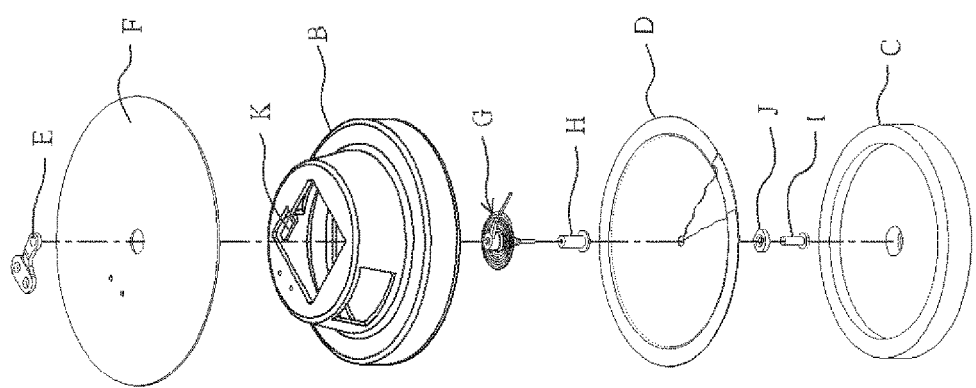
FIG. 2 is a perspective view of the exploded components of the conventional diaphragm pressure gauge.
Figure 3:
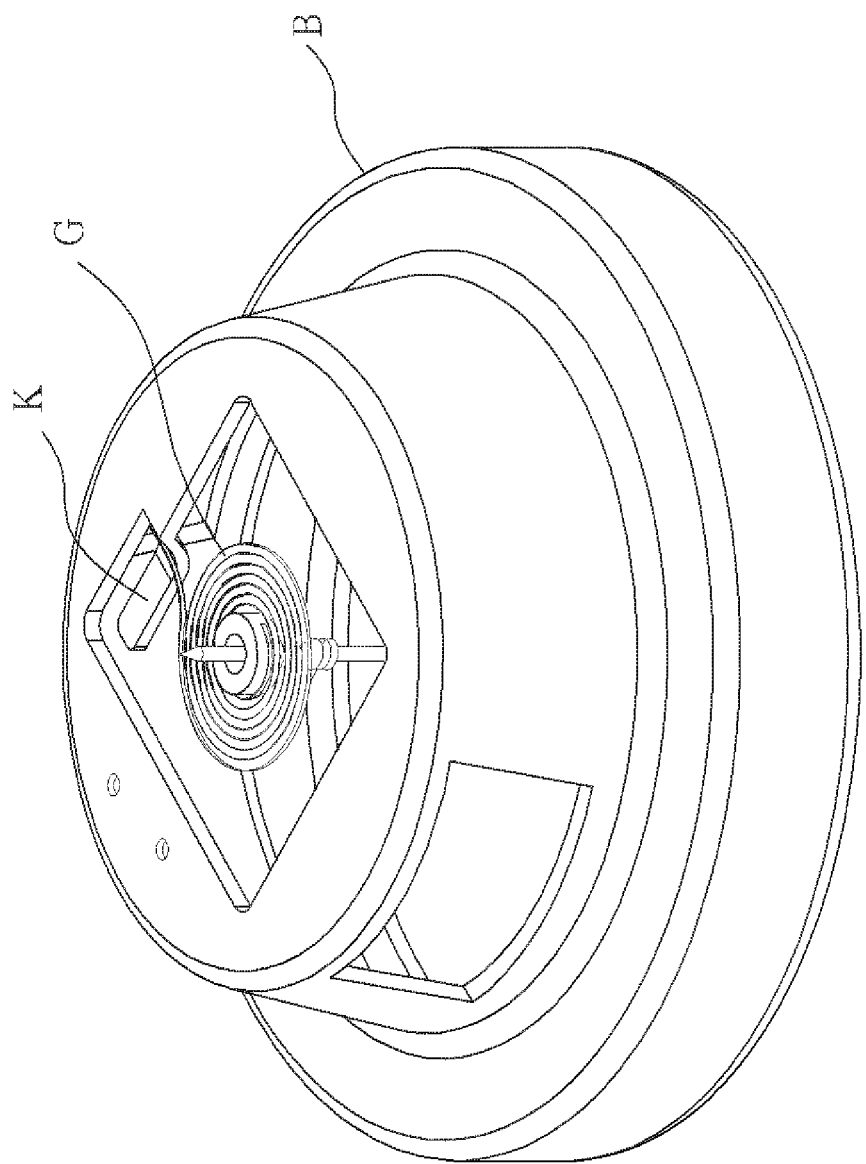
FIG. 3 is a perspective view of the assembly of the conventional diaphragm pressure gauge.
Figure 4:
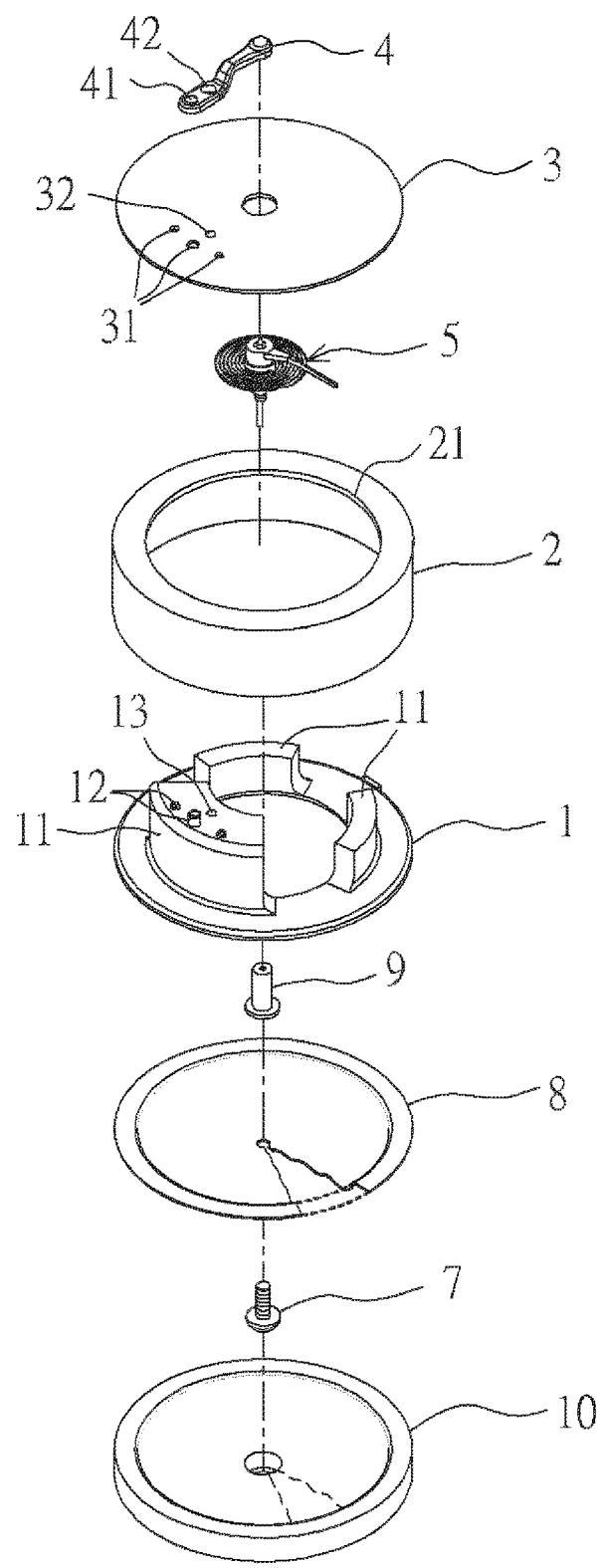
FIG. 4 is a perspective view of the exploded components of a connection structure of a diaphragm pressure gauge according to a preferred embodiment of the present invention.
Figure 5:
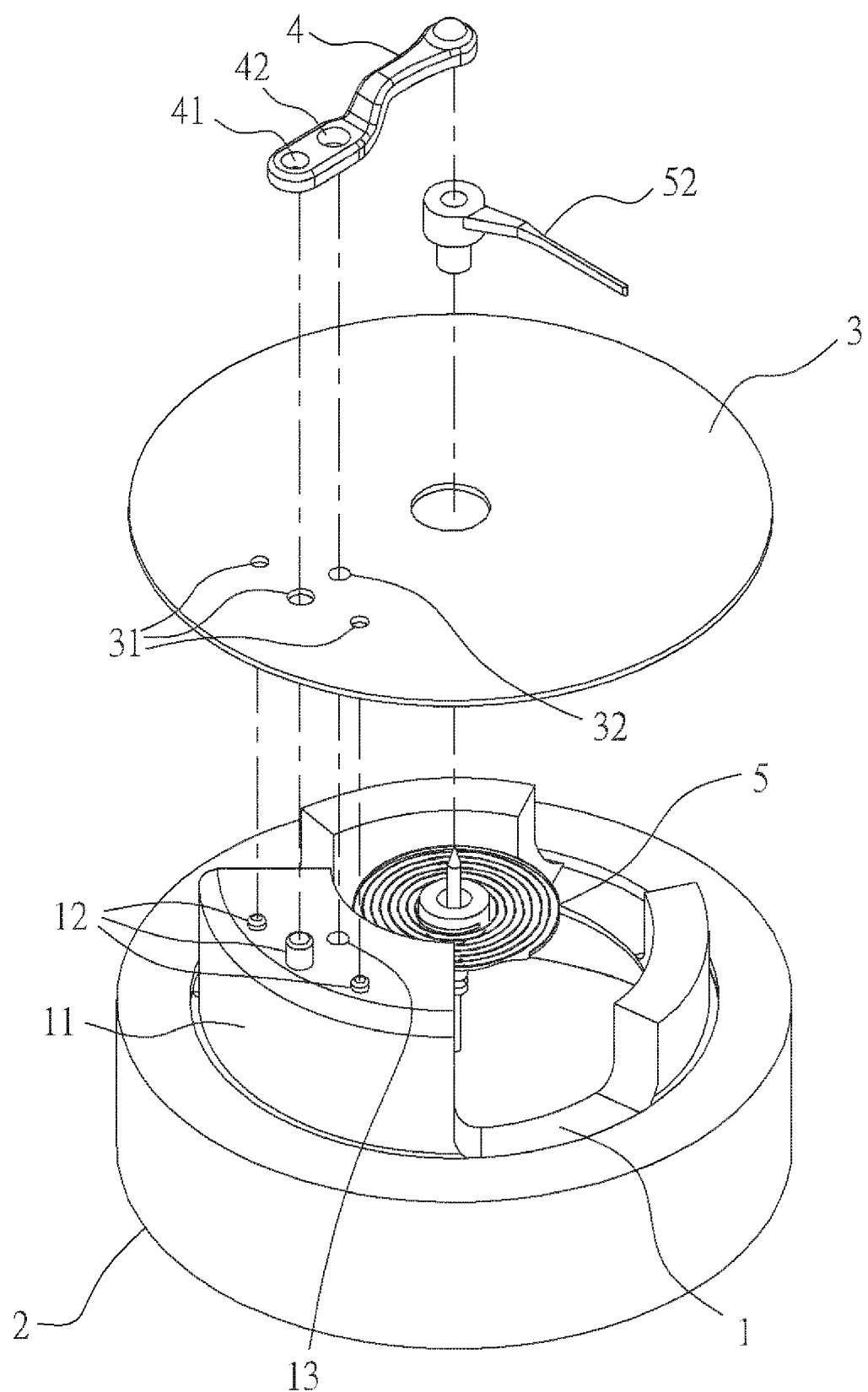
FIG. 5 is a perspective view of the exploded components of a part of the connection structure of the diaphragm pressure gauge according to a preferred embodiment of the present invention.
Figure 6:
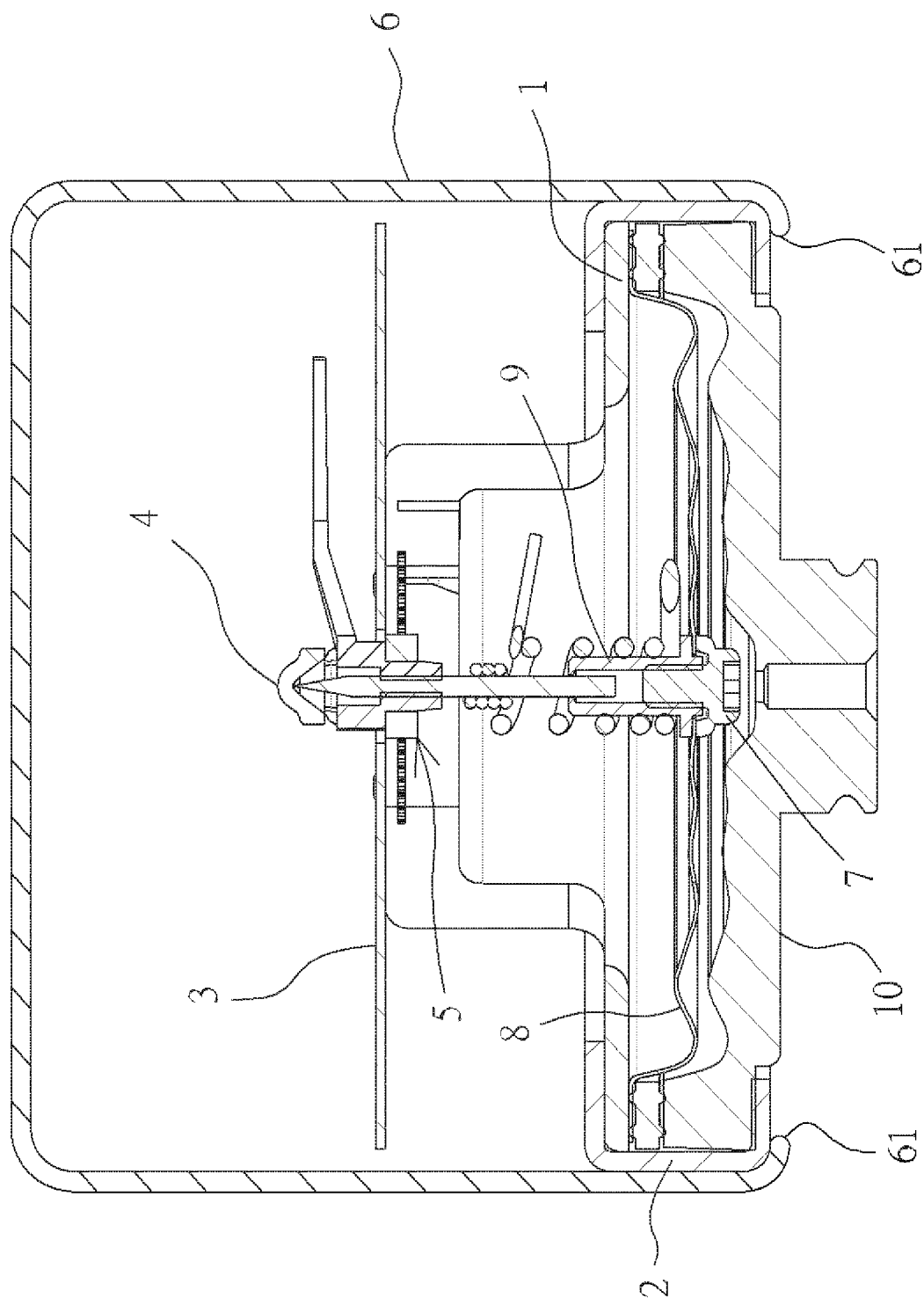
FIG. 6 is a cross sectional view showing the assembly of the diaphragm pressure gauge according to the preferred embodiment of the present invention.

With reference to FIGS. 4-6, a connection structure of a diaphragm pressure gauge according to a preferred embodiment of the present invention is applied to connect the diaphragm pressure gauge quickly and easily.

The connection structure comprises:

a holder 1 formed in a circular disc shape and including multiple spaced ribs 11 surround proximate to a peripheral side of a top of the holder 1, wherein one of the multiple spaced ribs 11 has at least one spaced protrusion 12 located adjacent to an outer side of a top of the one spaced rib 11, and the one spaced rib 11 has a first screwing orifice 13 defined inside the at least one spaced protrusion 12;

a coupling sleeve 2 being circular and including a protruded fringe 21 extending inward from a peripheral side of a top of the coupling sleeve 2, wherein the holder 1 is connected to the coupling sleeve 2, and the multiple spaced ribs 11 of the holder 1 extend out of the coupling sleeve 2 and contact with the protruded fringe 21;

a disc 3 being circular and mounted on the holder 1, the disc 3 including at least one first locating orifice 31 corresponding to the at least one spaced protrusion 12 respectively, and the disc 3 including a second screwing orifice 32 corresponding to the first screwing orifice 13;

a curved abutting bar 4 configured to abut against a fixing element 5, the curved abutting bar 4 including a second locating orifice 41 corresponding to the at least one spaced protrusion 12, and the curved abutting bar 4 including a third screwing orifice 42 corresponding to the second screwing orifice 32 and the first screwing orifice 13;

a case 6 including a hook 61 extending from a bottom of the case 6 and configured to hook a bottom of the coupling sleeve 2 so that the case 6 covers the coupling sleeve 2, wherein the case 6 is transparent; and a screw element 7 integrally formed with a washer 71 and being screwed with a defining element 9 via a circular film 8 such that the washer 71 and the defining element 9 fix the circular film 8.

The first screwing orifice 13 of the holder 1 corresponds to the second screwing orifice 32 of the disc 3 and the third screwing orifice 42 of the curved abutting bar 4.

The at least one spaced protrusion 12 is located on the top of the one spaced rib 11.

The holder 1 is made of plastic and is connected to the coupling sleeve 2 made of a material different from the plastic of the holder 1 so as to reinforce the connection structure of the diaphragm pressure gauge.

Figure 8:
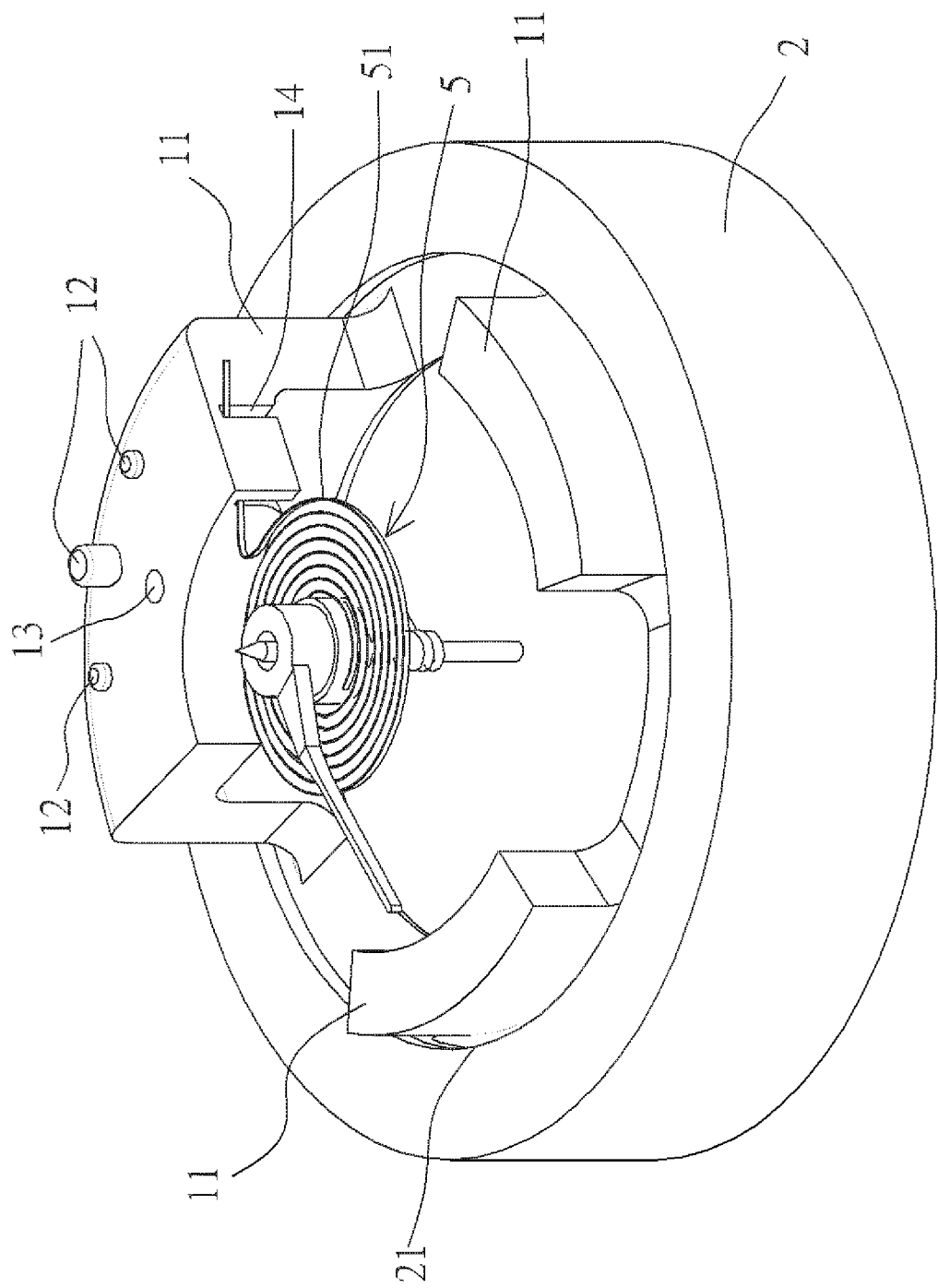
FIG. 8 is a perspective view showing the assembly of a part of the diaphragm pressure gauge according to the preferred embodiment of the present invention.

Referring to FIG. 8, the other spaced rib 11 has a slot 14 formed in a U shape so that when the fixing element 5 is fixed on the holder 1, a hair spring 51 of the fixing element 5 is retained in the slot 14.

Figure 7:
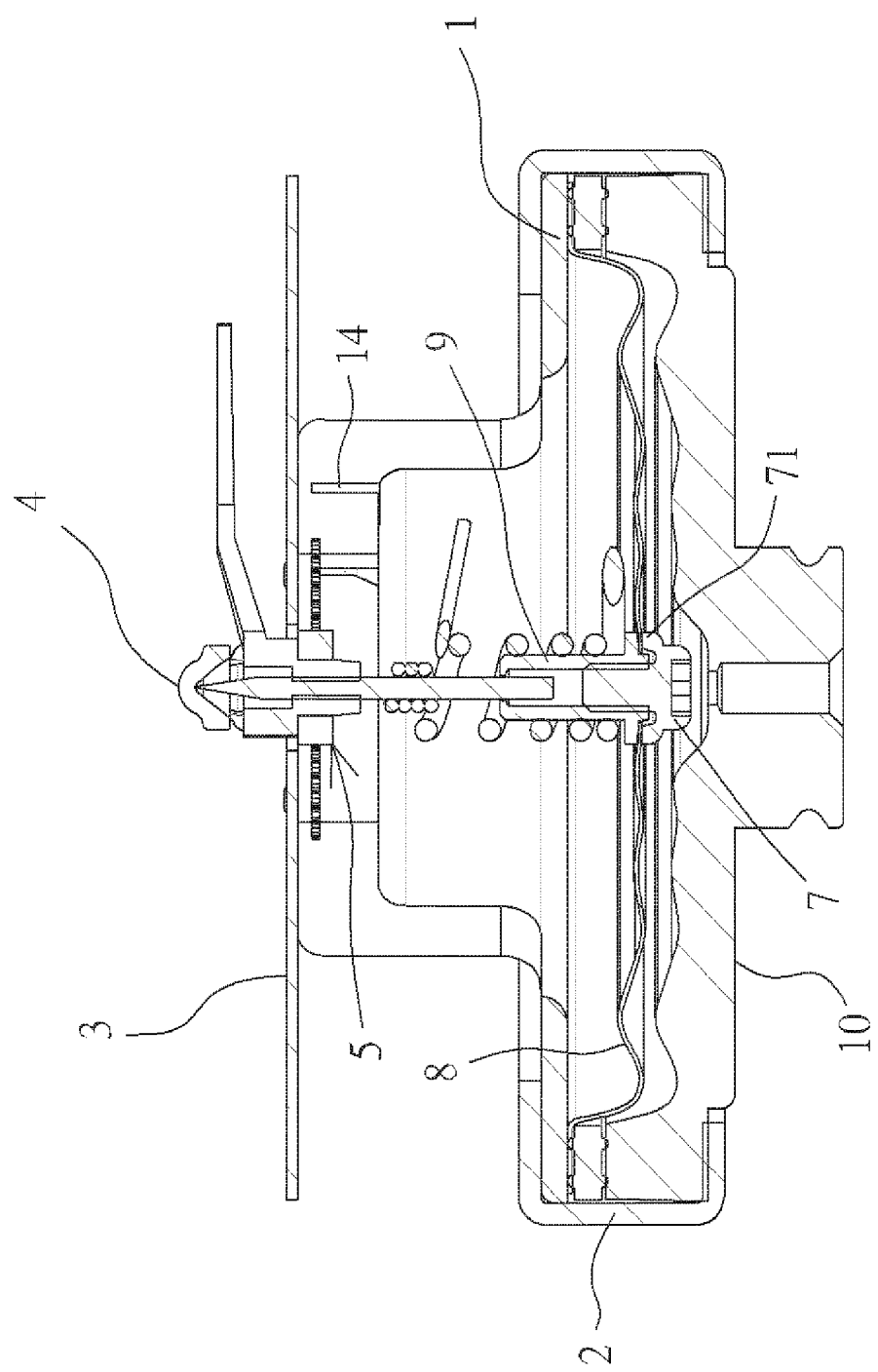
FIG. 7 is a cross sectional view showing the assembly of a part of the diaphragm pressure gauge according to the preferred embodiment of the present invention.

As shown in FIGS. 6 and 7, the holder 1, the coupling sleeve 2, the disc 3, the curved abutting bar 4, the fixing element 5, the case 6, the screw element 7, the circular film 8, the defining element 9, and a base 10 are connected. To fix the fixing element 5 on the holder 1 exactly, the holder 1 is connected to the coupling sleeve 2, and the fixing element 5 is fixed on the one other spaced rib 11 of the holder 1, such that an operation space is defined among the multiple spaced ribs 11 to fix the fixing element 5 quickly, as illustrated in FIG. 6.

Referring to FIG. 5, after the holder 1, the coupling sleeve 2, and the fixing element 5 are connected, the disc 3 is mounted with the curved abutting bar 4, then a pointer 52 of the fixing element 5 is fixed, such that the at least one first locating orifice 31 of the disc 3 is fitted with the second locating orifice 41 of the curved abutting bar 4 by ways of the at least one spaced protrusion 12 of the multiple spaced ribs 11 of the holder 1, and the first screwing orifice 13, the second screwing orifice 32, and the third screwing orifice 42 are aligned with one another to accommodate a positioning bolt (not shown), thus connecting the disc 3 and the curved abutting bar 4 quickly.

After the holder 1, the coupling sleeve 2, the fixing element 5, the disc 3, and the curved abutting bar 4 are connected, the circular film 8 and the base 10 are accommodated in the coupling sleeve 2, and the defining element 9 is disposed below the fixing element 5 and above the circular film 8. Then, the screw element 7 is screwed with the defining element 9 from the circular film 8 so that the washer 71 and the defining element 9 fix the circular film 8, thus connecting the diaphragm pressure gauge.

In addition, the case 6 is covered on the diaphragm pressure gauge so that the hook 61 hooks the bottom of the coupling sleeve 2, thus obtaining protection, decreasing alignment time and size, and saving fabrication cost to the diaphragm pressure gauge.

Preferably, the diaphragm pressure gauge is operated and is positioned in a limited space easily.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A connection structure of a diaphragm pressure gauge comprising: a holder, a coupling sleeve, a disc, a curved abutting bar, a fixing element, a case, a screw element, a circular film, and a defining element;

wherein the holder is connected to the coupling sleeve, multiple spaced ribs of the holder extend out of the coupling sleeve, and the holder includes the multiple spaced ribs surround proximate to a peripheral side of a top of the holder, wherein one of the multiple spaced ribs has at least one spaced protrusion located adjacent to an outer side of a top of the one spaced rib, the disc includes at least one first locating orifice corresponding to the at least one spaced protrusion respectively, the curved abutting bar includes a second locating orifice corresponding to the at least one spaced protrusion, and the at least one first locating orifice of the disc is fitted with the second locating orifice of the curved abutting bar by ways of the at least one spaced protrusion of the multiple spaced ribs of the holder, wherein the curved abutting bar abuts against the fixing element, and the defining element, the circular film and the screw element are connected below the fixing element to connect the diaphragm pressure gauge, then the case is covered on the diaphragm pressure gauge.

2. The connection structure as claimed in claim 1, wherein the at least one spaced protrusion is located on the top of the one spaced rib.

3. The connection structure as claimed in claim 1, wherein the holder is made of plastic and is connected to the coupling sleeve made of a material different from the plastic of the holder so as to reinforce the connection structure of the diaphragm pressure gauge.

4. The connection structure as claimed in claim 1, wherein the other spaced rib has a slot formed in a U shape so that when the fixing element is fixed on the holder, a hair spring of the fixing element is retained in the slot.

5. The connection structure as claimed in claim 1, wherein the case includes a hook extending from a bottom thereof and configured to hook a bottom of the coupling sleeve so that the case covers the coupling sleeve.

6. The connection structure as claimed in claim 5, wherein the case is transparent.

7. The connection structure as claimed in claim 1, wherein the case is transparent.

* * * * *